United States Patent
Mouleyre et al.

(10) Patent No.: US 10,730,484 B2
(45) Date of Patent: Aug. 4, 2020

(54) ADAPTER FOR CONNECTING A WIPER BLADE TO A DRIVING ARM OF A WIPING SYSTEM

(71) Applicant: Valeo Systèmes d'Essuyage, Le Mesnil Saint Denis (FR)

(72) Inventors: Guillaume Mouleyre, Issoire (FR); Stéphane Houssat, Issoire (FR); Vincent Gaucher, Issoire (FR)

(73) Assignee: Vaelo Systèmes d'Essuyage, Le Mesnil Saint Denis (FR)

( * ) Notice: Subject to any disclaimer, the term of this patent is extended or adjusted under 35 U.S.C. 154(b) by 194 days.

(21) Appl. No.: 15/982,487

(22) Filed: May 17, 2018

(65) Prior Publication Data

US 2018/0334139 A1    Nov. 22, 2018

(30) Foreign Application Priority Data

May 19, 2017    (FR) ..................... 17 54458

(51) Int. Cl.
*B60S 1/40*    (2006.01)

(52) U.S. Cl.
CPC ..... *B60S 1/4048* (2013.01); *B60S 2001/4051* (2013.01); *B60S 2001/4054* (2013.01); *B60S 2001/4093* (2013.01)

(58) Field of Classification Search
CPC .... B60S 1/4064; B60S 1/4045; B60S 1/4048; B60S 1/409; B60S 1/4093; B60S 1/4083; B60S 1/4087; B60S 2001/4022; B60S 2001/4058; B60S 2001/4054; B60S 2001/4051; B60S 2001/409; B60S 2001/4093

USPC ...................................... 15/250.32
See application file for complete search history.

(56) References Cited

U.S. PATENT DOCUMENTS

2017/0136998 A1* 5/2017 Mouleyre ............. B60S 1/4067

FOREIGN PATENT DOCUMENTS

| DE | 10257988 A1 | 2/2004 |
|---|---|---|
| DE | 10347637 A1 | 5/2005 |
| DE | 102011053090 A1 | 2/2013 |
| EP | 2597000 * | 5/2013 |

(Continued)

OTHER PUBLICATIONS

Machine translation of description portion of German publication 102011053090, published Feb. 2013. (Year: 2013).*

(Continued)

*Primary Examiner* — Gary K. Graham
(74) *Attorney, Agent, or Firm* — Osha Liang LLP

(57) ABSTRACT

An adapter (9) designed to connect a wiper blade to a drive arm of a wiping system for a motor vehicle, the adapter (9) extending primarily along a longitudinal axis (X) and comprising at least a body (24) having two sides (26) joined together, at least partially, by a bridge of material (27), a head (23) forming a first longitudinal end of the adapter (9), a rear portion (25) forming a second longitudinal end of the adapter (9) opposite the first longitudinal end with respect to the body (24), a flexible tongue (34) emerging from the body (24) of the adapter (9) and a knob (16) emerging from the flexible tongue (34), this knob (16) being configured to block the adapter (9) in a terminal portion of the drive arm of the wiping system.

12 Claims, 3 Drawing Sheets

(56) References Cited

FOREIGN PATENT DOCUMENTS

EP 3168093 A1 5/2017
FR 3006649 * 12/2014

OTHER PUBLICATIONS

Preliminary Searech Report and Written Opinion issued in corresponding French Application No. 1754458, dated Jan. 9, 2018 (6 pages).

* cited by examiner

ADAPTER FOR CONNECTING A WIPER BLADE TO A DRIVING ARM OF A WIPING SYSTEM

The present invention relates to wiper systems for motor vehicles, and more particularly it relates to an adapter included in a connection device of such a wiping system.

Motor vehicles are commonly equipped with windscreen wiping systems to provide a wiping of the glass surfaces, especially the front windscreen or the rear window of the vehicle, and to prevent the driver's view of his or her surroundings from being disturbed. These windscreen wipers traditionally comprise elongated arms, carrying doctor blades made of an elastic material, driven in movement by a drive arm to which they are attached by an appropriate connection device. The drive arm itself is connected to a driving device which moves it in an angular back and forth motion. The doctor blades rub against the glass surface and remove the water and dirt, bringing this outside the field of view of the driver.

The connection device traditionally comprises a connector and an adapter which attach the wiper blade to the drive arm, allowing a degree of freedom of rotation between these components. The connection device likewise ensures a removability between the wiper blade and the drive arm, so that the wiper blade can be replaced when it is worn out.

When replacing the wiper blade, the user must perform a rotation of the wiper blade with respect to the drive arm. There is thus a risk of "over-rotation", that is, a risk of too much rotation of this wiper blade with respect to the drive arm. The adapter providing the connection between this wiper blade and this drive arm may be damaged by such an "over-rotation".

More precisely, this adapter usually comprises a flexible tongue from which emerges a knob adapted to block the adapter in the drive arm. In the event of "over-rotation", this flexible tongue may break, and then the adapter can no longer perform its function of connection to the drive arm.

The purpose of the invention is to limit the risk of breakage when changing these wiper arms by proposing an adapter for a connection device comprising a device preventing the risk of over-rotation.

The present invention thus relates to an adapter designed to connect a wiper blade to a drive arm of a wiping system for a motor vehicle, the adapter extending primarily along a longitudinal axis and comprising at least:
  a body having two sides joined together, at least partially, by a bridge of material,
  a head forming a first longitudinal end of the adapter,
  a rear portion forming a second longitudinal end of the adapter opposite the first longitudinal end with respect to the body,
  a flexible tongue emerging from the body of the adapter and a knob emerging from the flexible tongue, this knob being configured to block the adapter in a terminal portion of the drive arm of the wiping system.

According to the present invention, the knob has at least one retaining member designed to limit a movement of the adapter along a direction perpendicular to a plane in which the bridge of material is inscribed, and in that the adapter comprises a device for limiting a rotation of the flexible tongue with respect to the rear portion of the adapter.

The knob of the flexible tongue blocks the movements of translation along the longitudinal axis, and the retaining member is able to block the movements of the adapter along the direction perpendicular to the bridge of material.

This retaining member bounds, with the knob from which it is made and with the flexible tongue, a zone of reception configured to receive an edge of the terminal portion of the drive arm.

The retaining member extends along a direction parallel to the longitudinal axis, from the knob and to the body of the adapter.

According to the present invention, the device for limiting a rotation of the flexible tongue with respect to the rear portion of the adapter comprises at least one foot which bears against the rear portion of the adapter.

The flexible tongue extends primarily in a plane of extension in which the longitudinal axis is inscribed. The foot extends primarily along a vertical axis, this vertical axis being perpendicular to the plane of extension of the flexible tongue. The knob of the flexible tongue for its part likewise extends along the vertical axis of the foot, this knob thus extending perpendicular to the flexible tongue from which it is made.

According to one characteristic of the present invention, the foot consists of the same material as at least the knob.

More precisely, the foot extends in a prolongation of the knob, i.e., perpendicular to the flexible tongue, this foot and this knob extending in opposite directions along the vertical axis. The foot may likewise be partly made of the same material as the flexible tongue.

According to one characteristic of the present invention, the foot has an L shape, this foot comprising a small arm and a large arm.

The large side of this foot may for example emerge from the knob of the flexible tongue and the small arm may beard against the rear portion of the adapter.

According to one characteristic of the present invention, the rear portion has at least one lateral face emerging from a side of the body of the adapter.

According to a first embodiment of the present invention, the device for limiting the rotation comprises a single foot which emerges from the knob of the adapter by its large arm and whose small arm bears against a lower edge of the lateral face of the rear portion.

It will be understood that the lower edge is situated opposite an upper surface of the adapter, in which the flexible tongue extends, with respect to the longitudinal axis.

According to the present invention, the rear portion of the adapter may comprise two lateral faces respectively emerging from each of the sides of the body of the adapter and one bottom wall joining these two lateral faces.

This rear portion may thus surround, at least partly, the knob and the device for limiting the rotation.

According to one variant of the first embodiment, the foot emerges from the knob of the flexible tongue by its large arm and the small arm of this foot bears against a lower edge of the bottom wall of the rear portion.

According to a second embodiment of the present invention, the device for limiting the rotation of the flexible tongue with respect to the rear portion of the adapter comprises two feet. According to this second embodiment, each of the feet emerges from the knob by its large arm and bears against the rear portion thanks to its small arm.

According to different variants of this second embodiment, each foot may bear either against the lower edge of the bottom wall of the rear portion or against the lower edge of one of the lateral faces of this rear portion.

According to one characteristic of the present invention, the head of the adapter has at least one lug emerging from a shoulder joining the head and the body, this lug being designed to be received in a scoop devised in the terminal portion of the drive arm.

According to one characteristic of the present invention, at least one external surface of one of the sides of the body comprises at least one pin designed to be received in a scoop devised in the terminal portion of the drive arm.

According to the invention, the scoop of the drive arm may have a U-shape able to receive both the lug of the head of the adapter and the pin of the body of this adapter. According to the present invention, the pin and the lug of the adapter are aligned along the longitudinal axis of the adapter.

The invention also relates to a wiper blade comprising at least one adapter according to the present invention.

The invention also relates to a wiping system comprising a wiper blade according to the present invention and a drive arm whose terminal portion has two lateral walls and an upper wall, a scoop being devised in each of the lateral walls, each of the scoops being configured to cooperate with a lug and/or a pin of the adapter and the upper wall of the terminal portion being provided with an opening designed to receive the knob of the adapter, one edge of this opening being interposed between the retaining member and the flexible tongue.

At least one of the edges of the opening devised in the upper wall of the terminal portion of the drive arm is thus received in the zone of reception bounded by the retaining member, by the knob from which it emerges, and by the flexible tongue from which this knob emerges.

It will thus be understood that the retaining member bears against the edge of the opening devised in the upper wall and in which the knob of the flexible tongue is inserted, thus ensuring a blocking of the adapter in the vertical direction.

According to the present invention, the terminal portion of the drive arm may have a clear space of U shape, adapted to receive the adapter, the sides of this U shape corresponding to the lateral walls of the terminal portion and the base of this U shape corresponding to the upper wall of this terminal portion. Thus, it will be understood that the lateral walls of the terminal portion of the drive arm overlap the sides of the body of the adapter and the upper wall of this terminal portion overlaps at least the bridge of material of this body, as well as the flexible tongue of the adapter.

According to the present invention, each of the lateral walls of the terminal portion of the drive arm has a terminal ridge inscribed in a plane parallel to the upper wall of this terminal portion.

Other details, characteristics and advantages will emerge more clearly from a reading of the detailed description given below for purposes of information, with regard to the different embodiments illustrated in the following figures.

Figure 1:
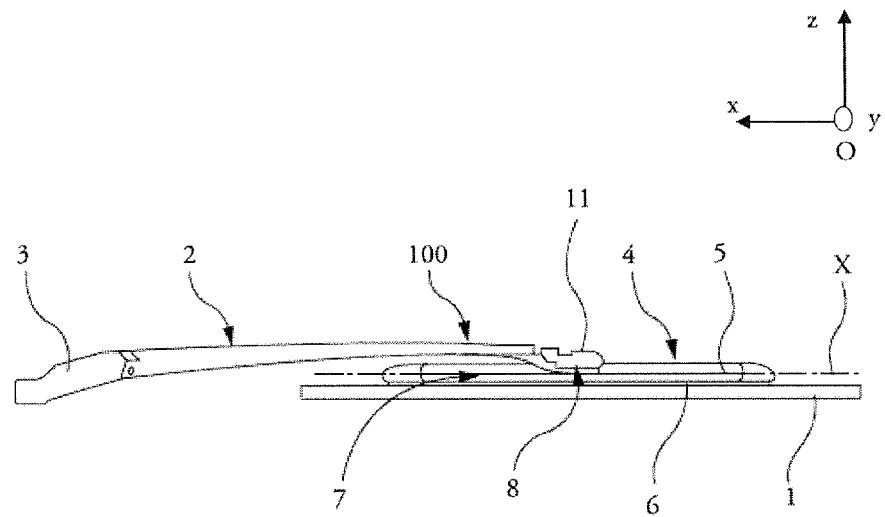
FIG. 1 is a schematic representation of a wiping system according to the present invention.

In the rest of the description, the terms longitudinal or transverse refer to the orientation of an adapter of a wiping system. The longitudinal direction corresponds to a direction of longitudinal extension of the adapter, this longitudinal direction being parallel to an axis Ox of an orthonormal reference system, for example as represented in FIG. 1. A transverse direction corresponds to a direction parallel to an axis Oy of this orthonormal reference system, the axis Oy being perpendicular to the axis Ox. A vertical direction corresponds to a direction parallel to an axis Oz of the orthonormal reference system, the axis Oz being perpendicular to the axis Ox and to the axis Oy.

The transverse sections mentioned below are produced along sectioning planes in which the axes Oy and Oz of the orthonormal reference system are inscribed, and the longitudinal sections for their part are produced along a sectioning plane in which the axes Ox and Oz of the orthonormal reference system are inscribed.

Referring to FIG. 1, a motor vehicle is commonly equipped with a wiping system 100 to evacuate water and/or dirt present on a glass surface 1, especially a rear window or a windscreen of the motor vehicle. The wiping system 100 comprises a drive arm 2 able to effect an angular back and forth motion along and on top of the glass surface 1. The drive arm 2 may comprise a driver 3 whose function is to provide a mechanical linkage between the drive arm 2 and a drive shaft (not shown) in rotation of the drive arm 2.

The wiping system 100 also comprises a wiper blade 4 which extends along a longitudinal axis, parallel to the axis Ox, known as the longitudinal axis X. The wiper blade 4 comprises at least one air deflector 5 and a doctor blade 6 joined to each other by a structure element 7 of the wiper blade 4, the latter being thus without lifting beams. Such a structure element 7 may be formed, for example, by a single bending member, or by a plurality of bending members or by a support in which one or more bending members are inserted.

The air deflector 5 is provided to transform a pressure applied by a flow of air circulating along the glass surface 1 into a force of the wiper blade 4 bearing against the glass surface 1 of the motor vehicle. The doctor blade 6 is the part of the wiper blade 4 in direct contact with the glass surface 1 and it is adapted to evacuate the water and/or dirt present on the latter. The air deflector 5, the doctor blade 6 and the structure element 7 form a semi-rigid assembly carried by a connection device 8, interposed between the drive arm 2 and the wiper blade 4.

Traditionally, this connection device 8 comprises an adapter and a connector, the connector being connected on the one hand to the wiper blade 4 and on the other hand to the adapter, and the adapter being connected to both the connector and to a terminal portion 11 of the drive arm 2.

The connection device 8 thus provides a mechanical linkage between the terminal portion 11 of the drive arm and the wiper blade 4. This connection device 8 also makes it possible to separate the wiper blade 4 from the drive arm 2, for the purpose of replacing the wiper blade 4.

Figure 2:
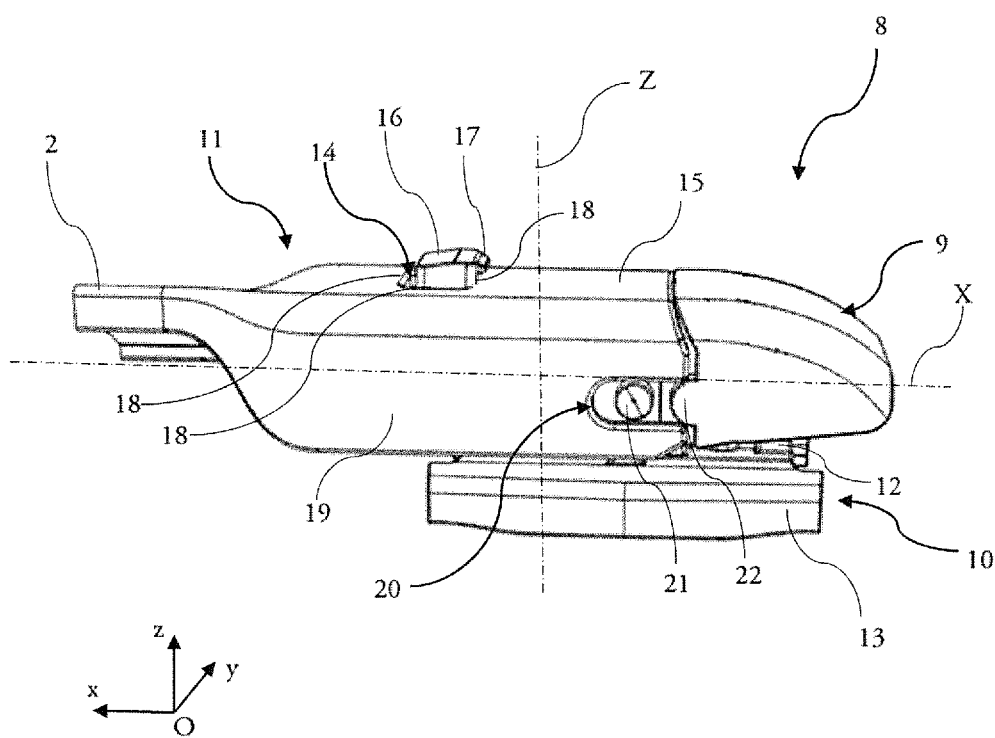
FIG. 2 is a perspective view of a connection device of the wiping system according to the present invention.

FIG. 2 illustrates the connection device 8 of the present invention, comprising the adapter 9 and the connector 10, where the adapter 9 is the piece which is lodged in the terminal portion 11 of the drive arm 2, this terminal portion 11 being likewise shown in this FIG. 2. As is illustrated, the connection device 8 extends along the longitudinal axis X.

The connector 10 comprises an upper portion, known as the pivot support 12, and a lower portion, known as the base 13. The terms "upper" and "lower" should be understood with reference to the terminal portion 11 of the drive arm, in the sense that this terminal portion 11 will overlap an upper portion of the connection device 8. Thus, the pivot support 12 and the base 13 are aligned along a vertical direction Z, this vertical direction Z being parallel to the axis Oz of the orthonormal reference system as represented in FIG. 2 and thus perpendicular to the longitudinal axis X of the connection device 8.

It will be understood that the pivot support 12 has the function of providing a rotation with respect to the adapter 9 and it extends in a clear U-shaped space in the adapter 9, as shall be described below.

According to one exemplary embodiment, the base 13 takes the form of two brackets enclosing a structure element of the wiper blade, this structure element being for example a bending member as previously described.

As illustrated, an opening 14 is devised in an upper wall 15 of the terminal portion 11 of the drive arm 2, this opening 14 being adapted to receive a knob 16 emerging from the adapter 9 and having a retaining member 17. As illustrated, this retaining member 17 extends along a direction parallel to the upper wall 15 and is destined to bear against one of the edges 18 bounding off the opening 14.

It will be understood that the knob 16 enables a first blocking of a translation of the adapter 9 along the longitudinal axis X and that the retaining member 17 enables a second blocking of the adapter 9 along the vertical direction Z. As can be seen in FIG. 2, the edges 18 of the opening 14 serve as an abutment for this knob 16 and this retaining member 17.

Despite these blockages, it is important that the connection device 8 maintains a certain degree of freedom in rotation with respect to the terminal portion 11 of the drive arm, especially in order to enable the changing of the wiper blade when it is worn out.

When changing this wiper blade, there is a risk of the user performing a wrong rotation of the wiper blade and having an excessive rotation liable to damage the connection device, and more particularly the adapter of this connection device. The invention thus proposes an adapter having a device limiting this rotation in order to prevent the user from damaging the wiping system during this replacement. The adapter according to the present invention is thus adapted to both a new product market and an after sale market.

This rotation limiting device will be described more fully in the rest of the description, especially in connection with FIGS. 3 and 4.

The terminal portion 11 of the drive arm 2 likewise comprises two lateral walls 19. Only one of these lateral walls 19 can be seen in FIG. 2, but it will be understood that the other wall faces it, these two lateral walls 19 being possibly symmetrical with respect to the longitudinal axis X.

A scoop 20 is devised in at least one of these lateral walls 19, this scoop 20 having a U shape adapted to receive a pin 21 and a lug 22 emerging from the adapter 9. This pin 21 and this lug 22 shall be described more fully in the rest of the description.

It will be understood that this pin 21 and this lug 22 are adapted to cooperate with the scoop 20 devised in the terminal portion 11 of the drive arm and thus enable a guiding and centering of the adapter 9 during its mounting in the terminal portion 11.

Figure 3:
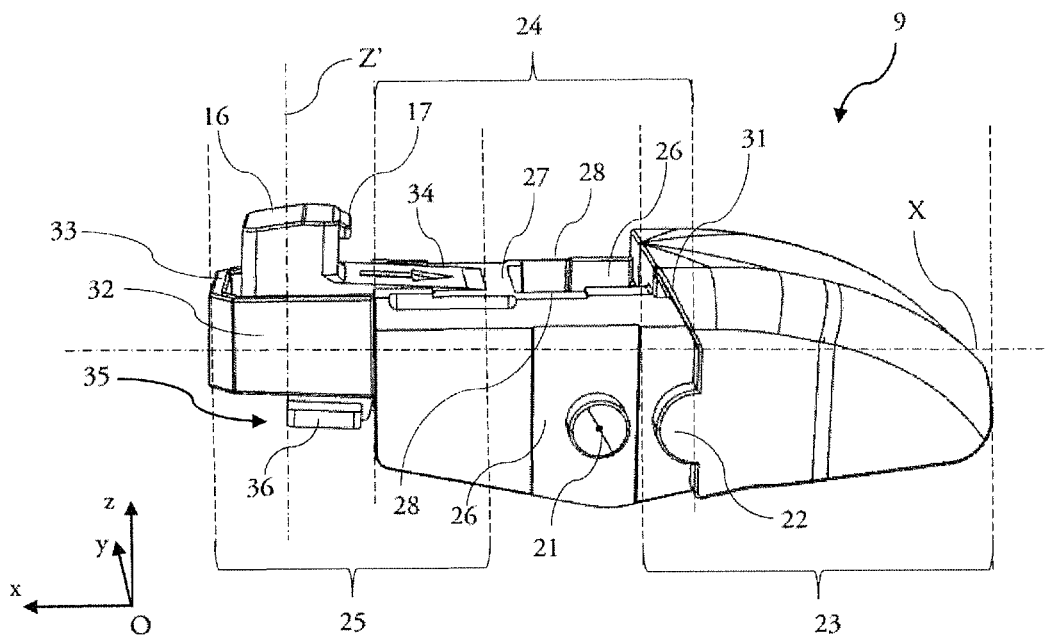
FIG. 3 is a perspective view of an adapter of the connection device illustrated in FIG. 2.
Figure 4:
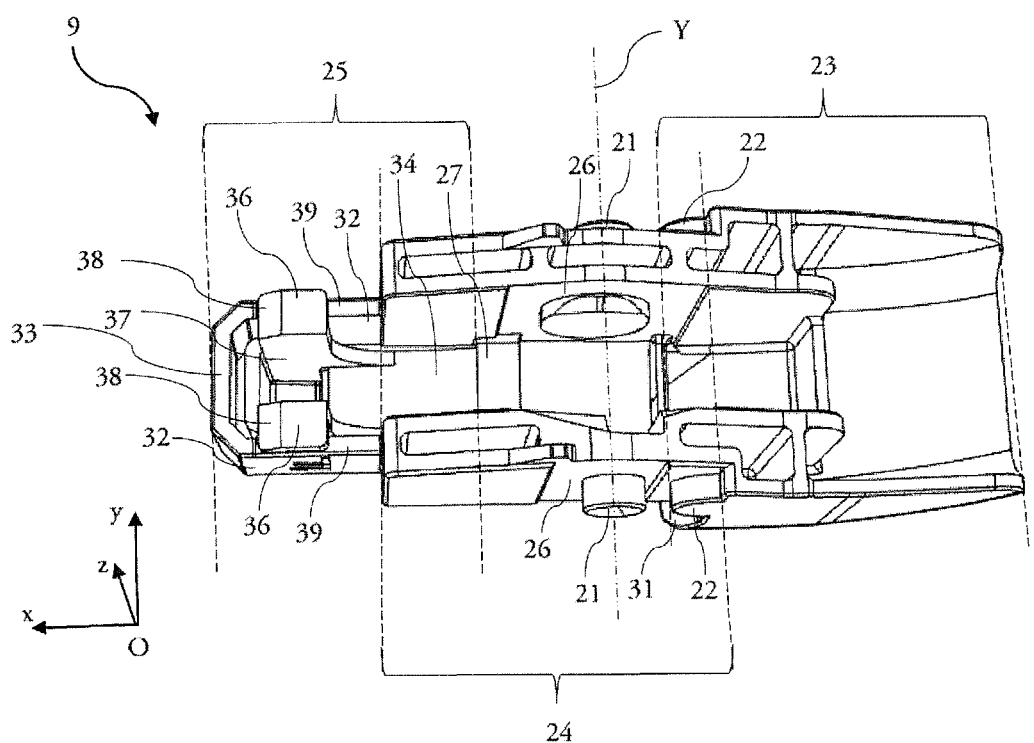
FIG. 4 is a perspective bottom view of the adapter of the connection device represented in FIG. 2.

FIGS. 3 and 4 are perspective views of the adapter 9 in one exemplary embodiment of the present invention, this adapter 9 being seen from the side in FIG. 3 and from below in FIG. 4.

The adapter 9 according to the present invention extends primarily along the longitudinal axis X and comprises, in sequence along the longitudinal axis X, a head 23, a body 24 and a rear portion 25.

According to one aspect of the present invention, the longitudinal axis X may form an axis of symmetry of the adapter 9. As illustrated, the head 23 forms a first longitudinal end of the adapter 9 and the rear portion 25 forms a second longitudinal end of this adapter 9, this first end and this second end being opposite with respect to the body 24 of the adapter 9.

The body 24 of the adapter 9 is bounded by at least two sides 26 joined together by at least one bridge of material 27, so as to have a U shape, seen from above. It will thus be understood that the base of this U is realized by the bridge of material 27 and the sides of the U are realized by upper edges 28 of the sides 26 of the body 24.

This body 24 likewise has a transverse section of U shape, this transverse section being inscribed in a plane parallel to the plane Oyz. This U shape makes it possible to clear a space adapted to receive the pivot support 12 of the connector, as previously mentioned.

The bridge of material 27 extends along a principal plane of extension which defines an upper surface of the body 24.

As previously mentioned, the adapter 9 comprises at least one pin 21 adapted to be received in the scoop devised in the lateral wall of the terminal portion of the drive arm. As can be seen in FIGS. 3 and 4, the pin 21 is realized on at least one of the sides 26 of the body, and more particularly on an external surface of this side 26, in other words on a surface designed to cooperate with the terminal portion of the drive arm as described above. It will thus be understood that these sides 26 likewise each comprise an internal surface, opposite the external surface of the corresponding side 26, and destined to cooperate with the connector of the connection device, and more particularly with the pivot support of this connector.

As can be seen in FIG. 4, the adapter according to the present invention comprises two pins 21 respectively devised on each of the sides 26 of the body 24 of the adapter 9.

These pins 21 each have a cylindrical shape and extend in a transverse direction Y, parallel to the axis Oy of the orthonormal reference system as represented in FIG. 4. Thus, these pins 21 extend along a direction perpendicular to the longitudinal axis X of the adapter 9 and away from the body 24.

It will be understood that these pins 21 are adapted to facilitate the assembly of the adapter 9 with the terminal portion of the drive arm.

As mentioned, the adapter 9 likewise contains a head 23 which extends longitudinally in a prolongation of the body 24, along the previously defined longitudinal axis X. As can be seen in FIGS. 3 and 4, the head 23 is taller and/or wider than the body 24 of the adapter 9. Thus, a shoulder 31 is formed which partly overlaps the external surfaces of the sides 26 of the body 24. This shoulder 31 serves as an abutment for the terminal portion of the drive arm, at least for one edge of the longitudinal end of the lateral walls of this terminal portion which abuts against it when the adapter 9 is mounted in this terminal portion.

According to one exemplary embodiment, the head 23 has a transverse section, that is, a section of the head 23 inscribed in a plane parallel to the plane Oyz of the orthonormal reference system, in a U shape, which as in the case of the body 24 makes it possible to clear a space in which the connector belonging to the connection device is able to extend and move freely in rotation. The adapter 9 further comprises at least one lug 22 adapted to being received in the scoop devised in the terminal portion of the drive arm. This lug 22 extends longitudinally, that is, along the longitudinal axis X, from the head 23 and impinging at least partly on the external surface of one of the sides 26 of the body 24. The lug 22 emerges from the shoulder 31 and has a curved shape, the vertex of the curve being oriented toward the body 24 of the adapter 9. As previously mentioned, this lug 22 provides a wedging and centering of the adapter 9 in the terminal portion of the drive arm. Such a lug 22 may be formed, for example, by a single half-disk emerging from the head 23 of the adapter 9, as can be seen in FIGS. 3 and 4.

According to one characteristic of the present invention, a lug 22 may impinge on one of the sides 26 of the body 24, or two lugs 22 may respectively impinge on each of the sides 26 of this body 24.

Finally, the adapter 9 comprises a rear portion 25 which likewise extends along the longitudinal axis X, away from the body 24. According to one exemplary embodiment of the present invention as illustrated in FIGS. 3 and 4, this rear portion 25 comprises two lateral faces 32 joined together by a bottom wall 33, this rear portion 25 thus having a U shape, seen from below, as represented for example in FIG. 4. Each of the lateral faces 32 of this rear portion 25 emerges from one of the sides 26 of the body 24, these lateral faces 32 and these sides 26 overlapping partly.

The rear portion 25 of the adapter surrounds at least partly a flexible tongue 34 made from the same material as the bridge of material 27 of the body 24 and likewise extending along the longitudinal axis X. In other words, this flexible tongue 34 is surrounded on the one hand by the U shape of the rear portion 25, and on the other hand by the bridge of material 27 of the body 24, this bridge of material 27 thus closing the U shape of the rear portion 25.

The flexible tongue 34 contains the knob 16 adapted to be lodged in the opening devised in the upper wall of the terminal portion of the drive arm, as previously described. This knob 16 extends primarily along a vertical axis Z', parallel to the axis Oz of the orthonormal reference system, and contains the retaining member 17 which extends primarily along a direction parallel to the longitudinal axis X, from the knob 16 and toward the body 24 of the adapter 9.

A device 35 limiting the rotation of the flexible tongue with respect to the rear portion 25 is likewise derived at least in part from the knob 16.

This device 35 limiting the rotation of the flexible tongue 34 is adapted to prevent an excessive rotation—also known as an "over-rotation"—of this flexible tongue 34, for example during a replacement of the wiper blade, with respect to the rear portion 25 of the adapter 9. In fact, in event of over-rotation, the flexible tongue 34 might break, which would then render the adapter 9 unusable.

According to a first exemplary embodiment of the present invention illustrated in FIGS. 3 and 4, the device 35 limiting the rotation of the flexible tongue 34 comprises two feet 36 which extend primarily along directions parallel to the vertical axis Z' along which the knob 16 extends, these feet 36 and this knob 16 extending in two opposite directions.

As can be seen in particular in FIG. 4, these feet 36 are derived from both the knob 16 and the flexible tongue 34 carrying this knob 16.

These feet 36 each comprise a large arm 37 and a small arm 38, thus taking on an L shape. As can be seen in particular in FIG. 4, these feet 36 emerge from the knob 16 and from the flexible tongue 34 by their large arm 37, their small arm 38 for its part extending toward the outside of the rear portion 25, along the transverse direction Y. In other words, these small arms 38 extend transversely away from the adapter 9.

It will thus be understood that, according to the exemplary embodiment illustrated in FIGS. 3 and 4, the small arms 38 of these feet 36 are adapted to bear respectively against each of the lateral faces 32 of the rear portion 25. More precisely, the small arms 38 of these feet 36 bear against the lower edges 39 of these lateral faces 32.

In order to allow the rotation of the adapter 9 with respect to the terminal portion of the drive arm in which it is assembled, the flexible tongue 34 is movable with respect to the rear portion 25 of the adapter 9. When the flexible tongue 34 moves, for example due to a rotation of the wiper blade, it will be understood that its movement is limited by the feet 36. In fact, the small arms 38 of these feet 36 bear against the lower edges 39 of the lateral faces 32 of this rear portion 25, thus serving as an abutment for these feet 36. The rotation of this flexible tongue 34 with respect to the rear portion of the adapter 9 is thus limited, preventing the breaking of this flexible tongue 34.

It will be understood that in fact in event of a breaking of this flexible tongue 34, the first blocking and the second blocking of the adapter with respect to the terminal portion of the drive arm as described above will no longer be assured, and therefore the adapter 9 will be unusable.

According to a second exemplary embodiment of the present invention, not shown, the device limiting the rotation of the flexible tongue comprises a single foot adapted to bear against the bottom wall of the rear portion of the adapter or against one of the two lateral faces of this rear portion.

According to a variant embodiment applicable to the first exemplary embodiment of the second exemplary embodiment, the rear portion of the adapter comprises a single lateral face emerging from one of the sides of the body of this adapter, the foot/feet thus bearing against this single lateral face.

Figure 5:
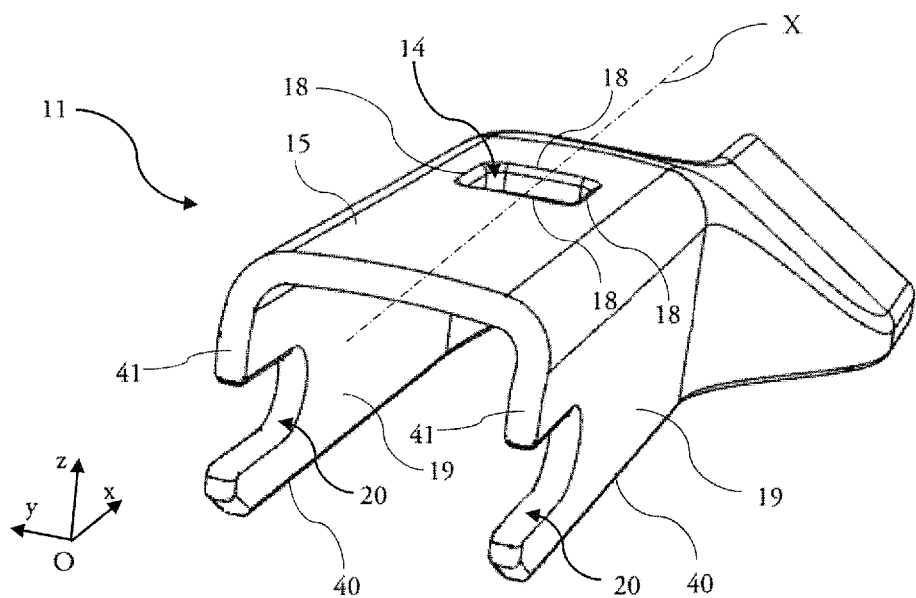
FIG. 5 is a perspective view of a terminal portion of a drive arm of a wiping system according to the present invention.

FIG. 5 is a perspective view of the terminal portion 11 of the drive arm, this terminal portion 11 extending primarily along the longitudinal axis X. As described with regard to FIG. 2, this terminal portion 11 comprises the upper wall 15, from which are derived the two lateral walls 19. Along a transverse section, the terminal portion 11 thus has a U shape, each of the lateral walls 19 terminating in a terminal ridge 40.

As illustrated in this FIG. 5, each of these terminal ridges 40 is inscribed in a plane parallel to the upper wall 15.

It will be understood that the U shape of this terminal portion 11 clears a space adapted to receive the adapter, as illustrated in FIG. 2.

As previously described, the lateral walls 19 each have a longitudinal end edge 41 adapted to bear against the shoulder formed by the overlapping of the body of the adapter and the head of this adapter. In order to allow a rotation of the adapter in an anti-clockwise direction about the axis Oy of the orthonormal reference system, a play is provided between this shoulder and each of the longitudinal end edges 41 of the terminal portion 11 of the drive arm.

The lateral walls 19 of the terminal portion 11 are likewise provided with scoops 20, each of these scoops 20 being devised longitudinally from one of the longitudinal end edges 41 of this terminal portion 11. As previously described, each of these scoops 20 has a U shape and is adapted to receive both the lug derived from the head of the adapter and the pin realized on at least one of the external surfaces of the sides of the body of this adapter.

The rotation of the adapter about the axis Oy is likewise permitted by the U-shaped space of this terminal portion 11, as well as by a play provided between each pin devised on the adapter and the scoop 20 devised in the terminal portion 11 of the drive arm with which it cooperates.

This rotation of the adapter makes it possible to replace the wiper blade when it is worn out, yet it gives rise to a risk of so-called "over-rotation", that is, a risk of an excessive rotation of the adapter with respect to the drive arm—and more particularly with respect to the terminal portion 11 of this drive arm—which may damage this adapter and then render it unusable.

As previously mentioned, the present invention makes it possible to limit this risk thanks to the device limiting the rotation of the flexible tongue with respect to the rear portion of the adapter.

The upper wall 15 of this terminal portion 11 comprises for its part the opening 14 adapted to receive the knob derived from the flexible tongue of the adapter. This opening 14 has a rectangular shape and is thus bounded by four edges 18. As previously mentioned, at least one of these edges 18 serves as an abutment for the retaining member derived from the knob.

Figure 6:
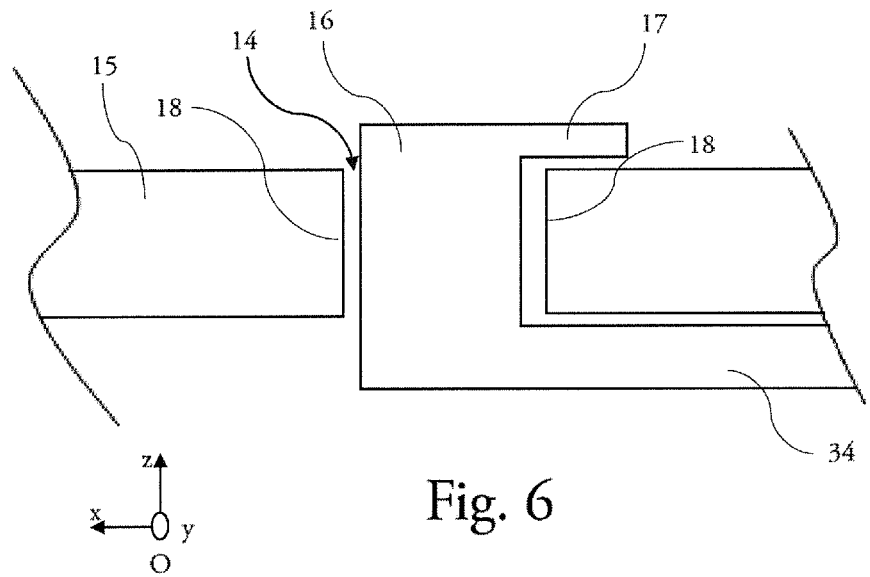
FIG. 6 is a schematic representation of a longitudinal section, here being a vertical section, produced in the area of a connection between the adapter and the terminal portion of the drive arm of the wiping system according to the present invention.

FIG. 6 is a schematic view of a longitudinal section, that is, a section produced along a plane parallel to the plane Oxz, produced in the area of the opening 14 devised in the upper wall 15 of the terminal portion 11 of the drive arm. As illustrated, the flexible tongue 34, the knob 16 and the retaining member 17 bound off a receiving zone adapted to receive at least one of the edges 18 bordering the opening 14. It will be understood from this FIG. 6 that the edges 18 of the opening 14 serve as an abutment for both the knob 16 and the retaining member 17 of this knob 16, thus ensuring the first blocking and the second blocking previously described.

It will be understood from the reading of the preceding text that the invention allows a user to replace a wiper blade of the wiping system of his or her vehicle without risk of damaging this wiping system by an excessive rotation. This objective is accomplished thanks to an adapter comprising a device limiting the rotation of the flexible tongue with respect to the rear portion of this adapter.

However, the invention should not be limited to the means and configurations described and illustrated here, and it likewise extends to all equivalent means or configurations and any technically operative combination of such means. In particular, the form, and the disposition of the device limiting the rotation of the flexible tongue with respect to the rear portion of the adapter may be modified without harming the invention, as long as it fulfils the same functionalities as those described in this document.

The invention claimed is:

1. An adapter for connecting a wiper blade to a drive arm of a wiping system for a motor vehicle, the adapter extending primarily along a longitudinal axis and comprising:
    a body having two sides joined together, at least partially, by a bridge of material;
    a head forming a first longitudinal end of the adapter;
    a rear portion forming a second longitudinal end of the adapter opposite the first longitudinal end with respect to the body,
    a flexible tongue emerging from the body of the adapter and a knob emerging from the flexible tongue, this knob being configured to block the adapter in a terminal portion of the drive arm of the wiping system,
    wherein the knob has at least one retaining member designed to limit a movement of the adapter relative to the terminal portion along a direction parallel to a vertical Z-axis, the direction being perpendicular to a plane in which the bridge of material is inscribed,
    wherein the adapter comprises a device for limiting a rotation of the flexible tongue with respect to the rear portion of the adapter, and
    wherein the device and the knob extend along the direction parallel to the vertical Z-axis, the device and the knob extending in opposite directions along the vertical Z-axis, wherein the device for limiting a rotation of the flexible tongue limits rotation of the tongue in the direction the knob extends.

2. The adapter according to claim 1, wherein the device for limiting the rotation of the flexible tongue with respect to the rear portion of the adapter comprises at least one foot which bears against the rear portion of the adapter.

3. The adapter according to claim 2, wherein the foot consists of the same material as at least the knob.

4. The adapter according to claim 2, wherein the foot has an L shape, this foot comprising a small arm and a large arm.

5. The adapter according to claim 4, wherein the foot emerges from the knob of the adapter by its large arm and wherein the small arm of this foot bears against a lower edge of the lateral face of the rear portion.

6. The adapter according to claim 1, wherein the rear portion has at least one lateral face emerging from a side of the body of the adapter.

7. The adapter according to claim 1, wherein the rear portion comprises two lateral faces respectively emerging from each of the sides of the body of the adapter and one bottom wall joining these two lateral faces.

8. The adapter according to claim 7, wherein the foot emerges from the knob of the adapter by its large arm and wherein the small arm of this foot bears against a lower edge of the bottom wall of the rear portion.

9. The adapter according to claim 1, wherein the head of the adapter has at least one lug emerging from a shoulder joining the head and the body, this lug being designed to be received in a scoop devised in the terminal portion of the drive arm.

10. The adapter according to claim 1, wherein at least one external surface of one of the sides of the body comprises at least one pin designed to be received in a scoop devised in the terminal portion of the drive arm.

11. A wiper blade comprising at least one adapter according to claim 1.

12. A wiping system comprising a wiper blade according to claim 11 and a drive arm whose terminal portion has two lateral walls and an upper wall, a scoop being devised in each of the lateral walls, each of the scoops being configured to cooperate with a lug and/or a pin of the adapter and the upper wall of the terminal portion being provided with an opening designed to receive the knob of the adapter, one edge bounding the opening being interposed between the retaining member and the flexible tongue.

* * * * *